Patented May 28, 1940

2,202,489

UNITED STATES PATENT OFFICE 2,202,489

METHOD OF PRODUCING POSITIVE ELECTRODES FOR LEAD-ACID STORAGE BATTERIES

Anna P. Hauel, New York, N. Y.

No Drawing. Application February 25, 1939,
Serial No. 258,584

14 Claims. (Cl. 136—27)

This invention relates to a process for the manufacture of positive electrodes for lead-acid storage batteries. The positive electrodes are usually manufactured by producing pastes of lead compounds, especially of lead powder or lead oxide mixed with aqueous solutions. The mixtures are then used for the manufacture of said electrodes. The known pastes are manufactured by mixing lead compounds usually lead powder i. e. finely divided lead consisting of metallic lead particles covered by oxide films or lead oxide with diluted sulphuric acid whereby lead sulphate is produced which acts as a bonding means. The water content of the paste originating from the diluted sulphuric acid evaporates during the drying process and causes the desired porosity of the plates.

The present invention is based on the conception that lead compounds mixed with water may increase their volume under certain conditions. According to the invention this is caused by the formation of lead hydrates formed under certain conditions in considerable quantity if lead compounds are mixed with water. The lead hydrates are formed in considerable amount by lead compounds usually by lead powder i. e. finely divided lead consisting of metallic lead particles covered by oxide films or lead oxide and water. Hereinafter the term lead hydrate designates lead hydroxides ($Pb(OH)_2$) and all basic lead hydroxides. Lead hydrates are strongly hydrated and are very bulky and therefore if the same are formed a large increase of the volume of the lead compounds takes place.

It has been found by tests that the increase of the volume produced by the formed lead hydrate causes changes of the structure and of the hardening process of the paste which is of highest importance.

For the useful life of the positive electrode there is a large difference whether the water which evaporates during the drying process of the plates and which produces the desired porosity of the same is bound during the manufacture by the lead sulphate or by lead hydrate in the paste. If the water is bound substantially by lead hydrate, desirable and favorable structures are produced which better stand the changes of volume which take place during charging and discharging of the electrodes than the structures which are produced when the water is bound by the lead sulphate only.

In order to achieve this aim it is accordingly an object of the invention to produce positive electrodes for lead-acid storage batteries by means of a process consisting in producing lead hydrates in a mixture containing at least one substance selected from the group consisting of lead oxides and lead powder, to cause thereby an increase of the volume of said mixture and to form pastes from the thus treated mixture for the manufacture of said electrodes.

It has been found by tests that it is possible to influence the formation of the lead hydrate by adding small amounts of reducing agents. The required amounts of such additions are so small that without doubt a catalytic reaction takes place. According to the invention for the formation of lead hydrate from lead compounds containing lead oxides or lead powder and water all organic and inorganic materials may be used as catalysts which are known as reducing agents. As reducing agents may be used, e. g., hydrazin, hydroxylamin and their salts, sulphite, bisulphites, thiosulphates and the like; or reducing gases such as hydrogen or other gases having a similar action. Very small amounts of the reducing agent e. g. less than 1 percent of the lead oxides or lead powder produce a strong increase of the formation of the lead hydrates.

The catalytic action of the reducing agent may be illustrated by the following example:

20 grams of lead powder i. e. finely divided lead consisting of metallic lead particles covered by oxide films are thoroughly mixed with 30 cubic centimeters of water and the mixture is put into a graduated testglass. After the lead powder has been allowed to settle for several hours the volume of the lead powder i. e. finely divided lead consisting of metallic lead particles covered by oxide films is read. It is about 8 cubic centimeters. The same test is repeated in such a way that 20 grams of lead powder are mixed with 30 cubic centimeters of water to which is added .02 gram of hydrazinchloride ($NH_2NH_3Cl$). Thereafter the mixture is thoroughly mixed and is put into the same graduated container. After the lead powder has been allowed to settle for several hours its volume is 15 cubic centimeters, i. e., nearly the double volume of that obtained without addition of reducing agents.

Accordingly it is a further object of the present invention to add reducing agents adapted to promote by a catalytic process the reaction between water and a substance selected from the group consisting of litharge and lead powder, thus to form lead hydrates in said lead oxides or lead powder and to produce thereby an increase of volume of said lead oxides or lead powder and to thereafter form a paste from the thus treated lead oxides or lead powder for the manufacture of electrodes for storage batteries.

A special disadvantage of the known processes is the fact that as is well known to the man skilled in the art not all lead compounds may be used for the manufacture of positive electrodes having a long useful life. Accordingly, usually the comparatively expensive red lead ($Pb_3O_4$) is used for the manufacture of positive plates. The present invention has the advantage that by the application of reducing agents the formation of hydrates is increased for substantially all kinds of lead powder i. e. finely divided lead consisting of metallic lead particles covered by oxide films and of lead oxide and accordingly substantially all kinds of lead powder and of lead oxides might be used for the manufacture of positive plates.

It has further been found that metallic lead powder too may be used for these purposes as a catalytic acting reducing agent. According to this modification of the process the lead oxides are left in excess of water for several hours, then there is added metallic lead powder, adapted to promote the reaction between the water and the lead oxides, i. e., which causes an increased and accelerated formation of the hydrates. The excess liquid is thereafter removed and a paste is formed from the thus treated lead oxides for the manufacture of said electrodes.

The results according to the invention are accomplished even when only metallic lead powder as lead compound is reacted for some time with water because in this case the metallic lead powder acts at the same time as the reducing agent.

According to another modification of the invention water, containing reducing agents adapted to promote the reaction between the water and a substance selected from the group consisting of a litharge and lead powder, is added to lead oxides or lead powder, thus lead hydrate is produced in said lead oxides and an increase of the volume of said lead oxides is caused, thereafter sulphuric acid is added in small amounts and a paste is formed from the thus treated lead oxides or lead powder for the manufacture of said electrodes. In this way comparatively large amounts of lead hydrates are produced in the paste. In spite of high content of water mixtures with good pasting qualities are produced which may be easily filled into grids and which produce plates which do not crack while drying and which become very hard after the drying process is accomplished.

A further modification consists therein that lead oxides or lead powder are treated with water in excess and that a small amount of a reducing agent is added to the water which promotes the reaction between water and a substance selected from the group of litharge and lead powder. The thus produced mixture may be stirred or heated; the excess liquid is removed and a paste is formed from the thus treated lead oxides or lead powder for the manufacture of said electrodes.

In this case the sulphuric acid may be added to the water by mixing same with the reducing agents, or the lead oxides or lead powder may be allowed to stand for several hours in an excess of water and with or without a reducing agent, and the sulphuric acid may be added later and mixed with the solution. Thereafter the excess liquid is removed and a paste is formed from the thus treated lead oxides or lead powder for the manufacture of said electrodes.

According to another modification the process may be executed in the following manner. The lead oxides or lead powder are treated with reducing gases. Thereafter water is added to the thus treated lead oxides or lead powder, then sulphuric acid is added in small amounts and pastes are formed from the thus treated lead oxides or lead powder for the manufacture of said electrodes. A modification of this process may be performed in the following manner: Lead powder is heated in a furnace with hydrogen gas. Thereafter the thus treated lead powder is left for several hours in excess water. Then a small amount of sulphuric acid may be added and mixed, the excess liquid then removed and a paste formed from the thus treated lead powder for the manufacture of said electrodes.

The process according to the invention may be performed in the following manner:

1. 10 kilograms of lead powder, i. e., finely divided lead consisting of metallic lead particles covered by oxide films are put into a container from 20 to 30 litres of water in which 30 grams of hydroxylaminchloride $NH_2OH \cdot HCl$ are dissolved and the mixture is allowed to stand in the container for several hours. The mixture may be stirred or may be heated in a given case. Thereafter the excess water is removed by pressing or by centrifuging the mixture until a suitable paste remains. This paste is used for the manufacture of positive electrodes by filling the same into grids and the like.

2. 10 kilograms of lead oxide are put into a container containing from 20 to 30 litres of water which contains 10 grams hydroxylaminchloride. The mixture is left in the container for several hours and the same may be stirred or heated. Thereafter the excess water is removed by pressing or centrifuging the mixture until a suitable paste remains. This paste is used for the manufacture of positive electrodes by filling the same into grids and the like.

3. Lead powder is heated in a suitable furnace together with hydrogen gas to about 50 to 150° centigrade. Then the lead powder is allowed to stand in excess water for several hours. The excess water is thereafter removed by pressing or centrifuging the mixture until a suitable paste remains. This paste is used for the manufacture of positive electrodes by filling the same into grids and the like.

4. 10 kilograms of lead powder or lead oxides are mixed with about 1600 cubic centimeters water containing 30 grams of hydroxylaminchloride. This mixture is used as paste for the manufacture of positive electrodes by filling the same into grids and the like.

5. 10 kilograms of lead powder, i. e., finely divided lead consisting of metallic lead particles covered by oxide films or lead oxides are mixed with about 1600 cubic centimeters water containing 30 grams of hydroxylaminchloride. About 200 cubic centimeters aqueous solution of sulphuric acid having a specific gravity of 1.40 are added. This mixture is used as paste for the manufacture of positive electrodes by filling the same into grids and the like.

6. 10 kilograms of lead powder or lead oxides are mixed with about 1800 cubic centimeters aqueous solution of sulphuric acid having a specific gravity of 1.03 containing 30 grams hydroxylaminchloride. This mixture is used as paste for the manufacture of positive electrodes by filling the same into grids and the like.

What I claim as new and desire to secure by Letters Patent is:

1. Method of producing positive electrodes for lead-acid storage batteries which comprises adding to a mixture containing at least one substance selected from the group consisting of lead oxides and lead powder, water and small amounts of reducing agents adapted to promote by a catalytic process the reaction between water and a substance selected from the group consisting of litharge and lead powder, thus forming lead hydrates, and forming pastes from the thus treated substances for manufacture of electrodes.

2. Method of producing positive electrodes for lead-acid storage batteries which comprises adding to a mixture containing at least one substance selected from the group consisting of lead oxides and lead powder water, sulphuric acid and small amounts of reducing agents adapted to promote by a catalytic process the reaction between water and a substance selected from the group consisting of litharge and lead powder, and forming pastes from the thus treated mixture for manufacture of positive electrodes.

3. Method of producing positive electrodes for lead-acid storage batteries which comprises mixing at least one substance selected from the group consisting of lead oxides and lead powder with water and small amounts of reducing agents adapted to promote by a catalytic process the reaction between water and a substance selected from the group consisting of litharge and lead powder, and forming pastes from the thus treated substances for manufacture of electrodes.

4. Method of producing positive electrodes for lead-acid storage batteries which comprises mixing at least one substance selected from the group consisting of litharge and lead powder with water and small amounts of reducing agents adapted to promote by a catalytic process the reaction between said water and said substances, and forming pastes from the thus treated substances for manufacture of electrodes.

5. Method of producing positive electrodes for lead-acid storage batteries which comprises adding to a substance selected from the group consisting of lead oxides and lead powder reducing agents adapted to promote by a catalytic process the reaction between water and a substance selected from the group consisting of litharge and lead powder, treating said substances with water, and forming pastes from the thus treated substances for the manufacture of electrodes.

6. Method of producing positive electrodes for lead acid storage batteries which comprises adding to a substance selected from the group consisting of lead oxides and lead powder reducing agents adapted to promote by a catalytic process the reaction between water and a substance selected from the group consisting of litharge and lead powder, treating said substances with water, adding thereafter sulphuric acid in small amounts, and forming pastes from the thus treated lead compound for the manufacture of electrodes.

7. Method of producing positive electrodes for lead acid storage batteries which comprises treating a substance selected from the group consisting of lead oxides and lead powder with water in excess, said water containing small amounts of reducing agents adapted to promote by a catalytic process the reaction between water and a substance selected from the group consisting of litharge and lead powder, removing the excess water, and forming pastes from the thus treated substances for the manufacture of said electrodes.

8. Method of producing positive electrodes for lead-acid storage batteries which comprises treating at least one substance selected from the group consisting of lead oxides and lead powder with water in excess, said water containing small amounts of reducing agents adapted to promote by a catalytic process the reaction between water and a substance selected from the group consisting of litharge and lead powder, stirring and heating said water containing said substances and said reducing agents, adding thereafter sulphuric acid in small amounts, removing the excess water, and forming pastes from the thus treated substances for the manufacture of electrodes.

9. Method of producing positive electrodes for lead-acid storage batteries which comprises adding to a substance selected from the group consisting of load oxides and lead powder water containing small amounts of reducing agents which by a catalytic process promote the reaction between water and a substance selected from the group consisting of litharge and lead powder, and forming pastes from the thus treated substances for manufacture of electrodes.

10. Method of producing positive electrodes for lead-acid storage batteries which comprises adding to a mixture containing at least one substance selected from the group consisting of lead oxides and lead powder aqueous solutions containing small amounts of reducing agents adapted to promote by a catalytic process the reaction between water and a substance selected from the group consisting of litharge and lead powder, adding thereafter sulphuric acid in small amounts, and forming pastes from the thus treated substances for the manufacture of electrodes.

11. Method of producing positive electrodes for lead-acid storage batteries which comprises treating a mixture containing at least one substance selected from the group consisting of lead oxides and lead powder with reducing gases adapted to promote by a catalytic process the reaction between water and a substance selected from the group consisting of litharge and lead powder, treating said substances with water, adding thereafter sulphuric acid in small amounts, and forming pastes from the thus treated mixture for the manufacture of electrodes.

12. Method of producing positive electrodes for lead-acid storage batteries which comprises heating lead powder in a furnace with reducing gases adapted to promote by a catalytic process the reaction between water and said lead powder, thereafter treating said lead powder with water in excess for several hours, removing the excess water, and forming pastes from the thus treated lead powder for the manufacture of electrodes.

13. Method of producing positive electrodes for lead-acid storage batteries which comprises heating lead powder in a furnace with hydrogen gas, thereafter treating said lead powder with water in excess, removing the excess water, and forming pastes from the thus treated lead powder for the manufacture of electrodes.

14. Method of producing positive electrodes for lead-acid storage batteries which comprises heating lead powder in a furnace with hydrogen gas, thereafter treating said lead powder with water in excess for several hours, adding thereafter sulphuric acid in small amounts, removing the excess water, and forming pastes from the thus treated lead powder for the manufacture of electrodes.

ANNA P. HAUEL.